United States Patent
Shi et al.

(10) Patent No.: US 10,305,325 B2
(45) Date of Patent: May 28, 2019

(54) WIRELESS ENERGY TRANSMISSION METHODS AND WIRELESS ENERGY SENDING DEVICES

(71) Applicant: Beijing Zhigu Rui Tuo Tech Co., Ltd, Beijing (CN)

(72) Inventors: Wei Shi, Beijing (CN); Ran Xu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 207 days.

(21) Appl. No.: 15/306,080

(22) PCT Filed: Mar. 12, 2015

(86) PCT No.: PCT/CN2015/074072
§ 371 (c)(1),
(2) Date: Oct. 21, 2016

(87) PCT Pub. No.: WO2015/161725
PCT Pub. Date: Oct. 29, 2015

(65) Prior Publication Data
US 2017/0047778 A1    Feb. 16, 2017

(30) Foreign Application Priority Data

Apr. 23, 2014 (CN) .......................... 2014 1 0166517

(51) Int. Cl.
*H02J 7/02* (2016.01)
*H02J 50/00* (2016.01)
(Continued)

(52) U.S. Cl.
CPC .............. *H02J 50/10* (2016.02); *H02J 7/025* (2013.01); *H02J 50/00* (2016.02); *H02J 50/20* (2016.02); *H02J 50/40* (2016.02); *H02J 50/80* (2016.02)

(58) Field of Classification Search
CPC .. H02J 50/12; H02J 50/20; H02J 50/40; H02J 7/025
See application file for complete search history.

(56) References Cited

U.S. PATENT DOCUMENTS 8,410,953 B2   4/2013 Zeine
8,723,642 B2   5/2014 Park et al.
(Continued)

FOREIGN PATENT DOCUMENTS

CN    102208836 A   10/2011
CN    102760332 A   10/2012
(Continued)

OTHER PUBLICATIONS

International Search Report for PCT Application No. PCT/CN2015/074072, dated Apr. 28, 2015, 3 pages.

*Primary Examiner* — Jeffrey M Shin
(74) *Attorney, Agent, or Firm* — Amin, Turocy & Watson, LLP (57) ABSTRACT

Wireless energy transmission methods and wireless energy sending devices are provided. The method comprises: transmitting, according to remaining energy information of at least one preferential device among multiple wireless energy receiving devices, wireless energy to at least one of the at least one preferential device, until a predetermined energy standard corresponding to the preferential device on which wireless energy transmission is performed is reached. The methods and devices can enable one or more wireless energy receiving devices to be preferentially charged as wanted by a user in a process that a wireless energy sending device transmits energy to multiple wireless energy receiving devices.

19 Claims, 5 Drawing Sheets

(51) Int. Cl.
*H02J 50/10* (2016.01)
*H02J 50/20* (2016.01)
*H02J 50/40* (2016.01)
*H02J 50/80* (2016.01)

(56) References Cited

U.S. PATENT DOCUMENTS

| | | |
|---|---|---|
| 8,836,279 B2 | 9/2014 | Nakano |
| 2012/0112539 A1 | 5/2012 | Yamamoto |
| 2012/0313446 A1* | 12/2012 | Park ................ H02J 5/005 307/104 |
| 2013/0297090 A1 | 11/2013 | Lelkens et al. |
| 2014/0035379 A1* | 2/2014 | Stevens ............. H02J 7/0013 307/104 |
| 2014/0217967 A1* | 8/2014 | Zeine ................. H02J 7/025 320/108 |

FOREIGN PATENT DOCUMENTS

| | | |
|---|---|---|
| CN | 103370846 A | 10/2013 |
| CN | 103944282 A | 7/2014 |
| CN | 103944283 A | 7/2014 |
| CN | 103972993 A | 8/2014 |
| WO | 2013119395 A1 | 8/2013 |
| WO | 2015161723 A1 | 10/2015 |
| WO | 2015161724 A1 | 10/2015 |

\* cited by examiner

Perform, according to remaining energy information of at least one preferential device among multiple wireless energy receiving devices, wireless energy transmission on at least one of the at least one preferential device, until a predetermined energy standard corresponding to the preferential device on which wireless energy transmission is performed is reached — S150

WIRELESS ENERGY TRANSMISSION METHODS AND WIRELESS ENERGY SENDING DEVICES

RELATED APPLICATION

The present application is a U.S. National Stage filing under 35 U.S.C. § 371 of international patent cooperation treaty (PCT) application No. PCT/CN2015/074072, filed Mar. 12, 2015, and entitled "WIRELESS ENERGY TRANSMISSION METHODS AND WIRELESS ENERGY SENDING DEVICES", which claims the benefit of priority to Chinese Patent Application No. 201410166517.8, filed on Apr. 23, 2014, which applications are hereby incorporated into the present application by reference herein in their respective entireties.

TECHNICAL FIELD

The present application relates to the field of wireless energy transmission, and in particular, to wireless energy transmission methods and wireless energy sending devices.

BACKGROUND

In wireless charging/power supply technologies, an energy sending device and an energy receiving device may perform energy transmission in a wireless manner. An existing wireless charging/power supply technology comprises an inductive coupling technology, a magnetic resonance technology, and a microwave energy transmission technology, and the like. The inductive coupling technology and the magnetic resonance technology are applicable to a short distance (centimeter level) wireless charging/power supply application scenario, whereas the microwave energy transmission technology may implement wireless energy transmission between an energy sending device and an energy receiving device in a long distance (the maximum distance is about 10 meters) application scenario.

Figure 1:
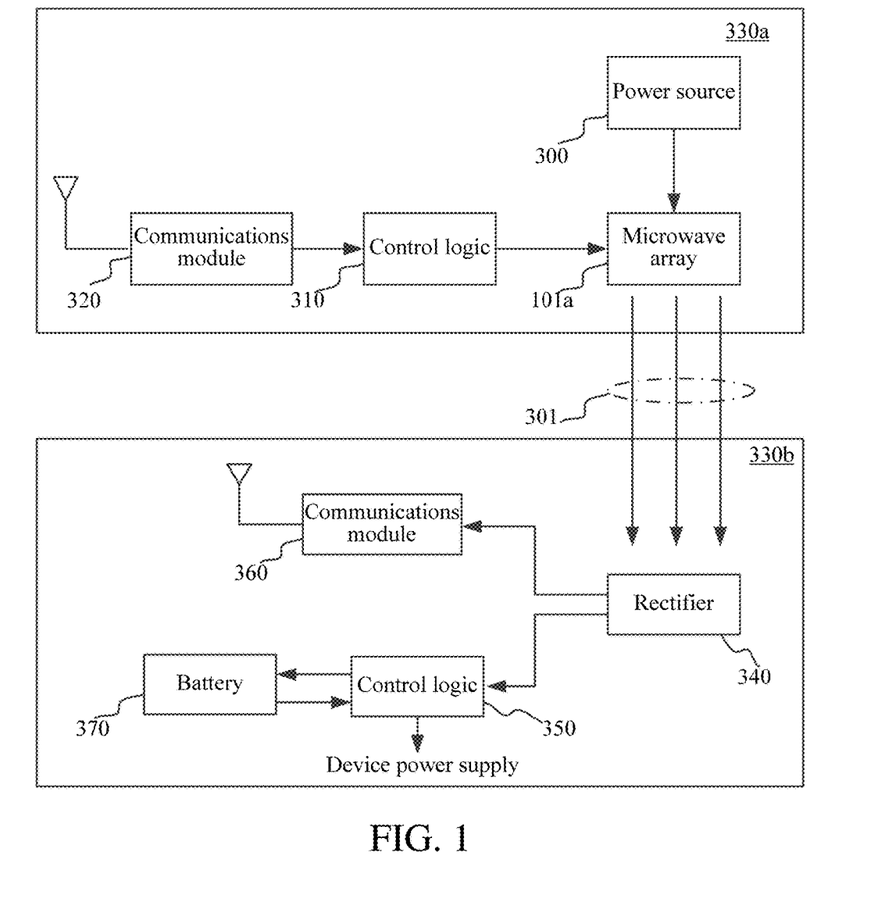
FIG. 1 is an example diagram of a working principle of a microwave energy transmission technology in the prior art.

FIG. 1 shows a working principle of a microwave energy transmission technology. In a wireless energy transmission system shown in FIG. 1, a wireless energy sending device 330a comprises a power source 300, a communications module 320, control logic 310, and a microwave array 101a, and a wireless energy receiving device 330b comprises a rectifier 340, control logic 350, a communications module 360, and a battery 370. The wireless energy sending device 330a transmits energy 301 to the wireless energy receiving device 330b in a wireless microwave manner. The microwave array 101a in the wireless energy sending device 330a comprises multiple phase adjustable emitter nodes, for example, up to 20000 emitter nodes, which are configured to send the energy 301, and the rectifier 340 in the wireless energy receiving device 330b receives the energy 301, so as to supply power to the battery 370 in the wireless energy receiving device 330b. At the beginning as a wireless energy transmission relationship starts to be established between the wireless energy sending device 330a and the wireless energy receiving device 330b, the microwave array 101a in the wireless energy sending device 330a adjusts phases of the emitter nodes one by one, so that each emitter node is adjusted to an optimal phase of performing wireless energy transmission to achieve an optimal wireless energy transmission effect. The foregoing process is referred to as a "phase calibration stage". In the phase calibration stage, the communications apparatus 360 in the wireless energy receiving device 330b continuously sends a feedback signal to the communications apparatus 320 of the wireless energy sending device 330a by using a wireless data communication channel, so as to report, to the wireless energy sending device 330a, wireless energy transmission intensity (or wireless energy transmission power) received by the rectifier 340. The control logic 310 in the wireless energy sending device 330a adjusts the phases of the emitter nodes in the microwave array 101a one by one on the basis of the feedback signal, until the wireless energy transmission intensity reported by the communications apparatus 360 in the wireless energy receiving device 330b becomes maximal, and the phase calibration stage ends.

Figure 2:
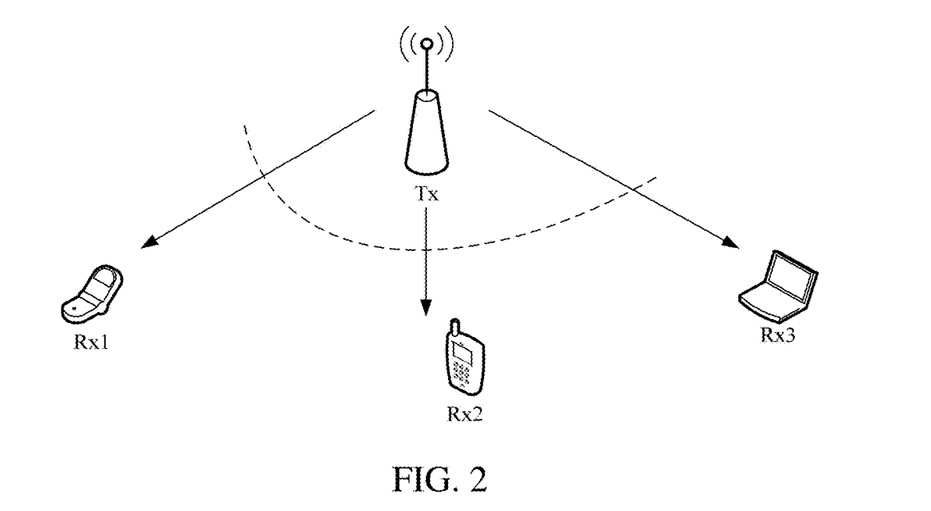
FIG. 2 is an example schematic diagram that one wireless energy sending device performs wireless energy transmission on multiple wireless energy receiving devices in the prior art.

As shown in FIG. 2, when multiple wireless energy receiving devices Rx exist in a wireless energy transmission range of one wireless energy sending device Tx; for example, multiple terminal devices in a user's room need to be charged. The multiple wireless energy receiving devices Rx may perform wireless energy transmission with the wireless energy sending device Tx in a sharing manner. In many scenarios, for urgent use of a terminal device or other causes, a user wants one or more wireless energy receiving devices to be preferentially charged, or at least to be preferentially charged a predetermined extent.

SUMMARY

An example, non-limiting objective of the present application is to provide a wireless energy transmission technology.

According to an example aspect of the present application, a wireless energy transmission method is provided, where the method comprises:

performing, according to remaining energy information of at least one preferential device among multiple wireless energy receiving devices, wireless energy transmission on at least one of the at least one preferential device, until a predetermined energy standard corresponding to the preferential device on which wireless energy transmission is performed is reached.

According to another example aspect of the present application, a wireless energy sending device is further provided, where the device comprises:

a wireless energy transmission module, configured to perform wireless energy transmission on at least one wireless energy receiving device; and a control module, configured to control, according to remaining energy information of at least one preferential device among multiple wireless energy receiving devices, the wireless energy transmission module to perform wireless energy transmission on at least one of the at least one preferential device, until a predetermined energy standard corresponding to the preferential device on which wireless energy transmission is performed is reached.

The methods and devices of the present application can enable one or more wireless energy receiving devices to be preferentially charged as wanted by a user in a process that a wireless energy sending device transmits energy to multiple wireless energy receiving devices in a system.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Various embodiments of the present application are further described in detail below with reference to the accompanying drawings (same reference numerals in several accompanying drawings represent same elements) and embodiments. The following embodiments are for describing the present application, but are not intended to limit the scope of the present application.

A person skilled in the art may understand that the terms such as "first" and "second" in the present application are merely for differentiating different steps, devices, modules, or the like, and neither represent any specific technical meanings nor represent a certain logic sequence among them.

In the embodiments of the present application, multiple wireless energy receiving devices may exist in a wireless energy transmission range of one wireless energy sending device, and a wireless energy transmission relationship occurs between the multiple wireless energy receiving devices and the wireless energy sending device in a sharing manner. To meet a need of a user to preferentially charge one or more wireless energy receiving devices, remaining energy levels of at least some devices among the wireless energy receiving devices may be checked and considered, and one or more preferential devices are determined among the multiple wireless energy receiving devices according to the need of the user, so that the wireless energy sending device preferentially performs wireless energy transmission on these devices, until the need of preferentially charging of the user is met.

Figure 3:
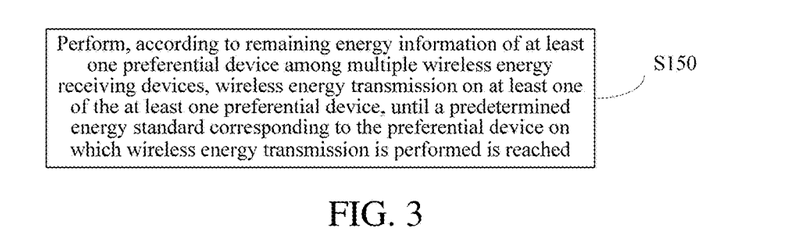
FIG. 3 is an example flowchart of steps of a wireless energy transmission method in an embodiment of the present application.

As shown in FIG. 3, a wireless energy transmission method is provided according to an embodiment of the present application. The method may be implemented by a wireless energy sending device in a wireless energy transmission system, so as to perform wireless energy transmission on multiple wireless energy receiving devices in the system. The method comprises:

S150: Perform, according to remaining energy information of at least one preferential device among multiple wireless energy receiving devices, wireless energy transmission on at least one of the at least one preferential device, until a predetermined energy standard corresponding to the preferential device on which wireless energy transmission is performed is reached.

Next, the functions of the steps in a wireless energy transmission method in this embodiment are described in detail with reference to FIG. 3 and FIG. 4.

Figure 4:
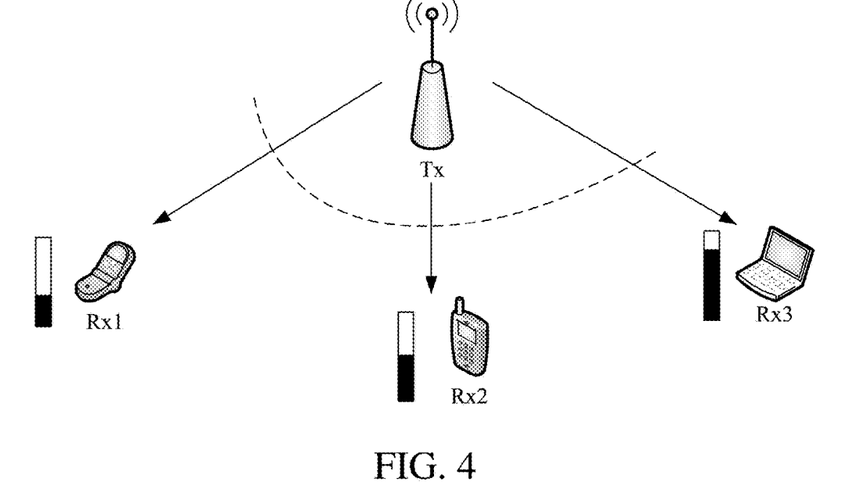
FIG. 4 is an example diagram of an example of a wireless energy transmission system to which a wireless energy transmission method in an embodiment of the present application is applicable.

FIG. 4 shows an example of a wireless energy transmission system to which the method in this embodiment is applicable. The system comprises one wireless energy sending device Tx and multiple wireless energy receiving devices Rx. FIG. 4 exemplarily shows 3 wireless energy receiving devices Rx1, Rx2, and Rx3. In a practical application scenario, the number of the wireless energy receiving devices may also be two or greater than 3. In this embodiment, among the foregoing 3 wireless energy receiving devices Rx1, Rx2, and Rx3, at least one preferential device needs to be preferentially charged, until a predetermined standard needed by a user is reached.

In an example embodiment, the method in this embodiment may further comprise S110: Determine the at least one preferential device among the multiple wireless energy receiving devices. In the system shown in FIG. 4, assuming that a user soon needs to leave with one or more of the wireless energy receiving devices Rx1, Rx2, and Rx3, in S110, it may be determined that one or more of the wireless energy receiving devices Rx1, Rx2, and Rx3 are preferential devices.

In an example embodiment of S110, the at least one preferential device among the multiple wireless energy receiving devices may be determined according to preferential device information, and the preferential device information may comprise identifier information of a preferential device and a predetermined energy standard corresponding to the preferential device. For example, when it is determined that Rx1 is a preferential device, the preferential device information may be shown in Table 1 below:

TABLE 1

| Device Identifier (ID) | Predetermined Energy Standard |
| --- | --- |
| R x 1 | η1 |

Table 1 comprises device identifier information (ID) of a preferential device to be determined and a corresponding predetermined energy standard (represented by η) A person skilled in the art may understand that the predetermined energy standard η may be a remaining energy value of the preferential device after the preferential device meets a charging need of a user, and may be reflected by, for example, a percentage of charge after the device is charged relative to full charge of a battery of the device, or a voltage value after the battery of the device is charged.

In the example shown in FIG. 4, Table 2 below uses a percentage of charge after the preferential device Rx1 is charged relative to full charge of a battery as an example to reflect a predetermined energy standard of the preferential device Rx1:

TABLE 2

| Device Identifier (ID) | Predetermined Energy Standard |
| --- | --- |
| R x 1 | 90% |

As shown in Table 2, the wireless energy sending device Tx preferentially performs wireless energy transmission on the preferential device Rx1, until the charge of the preferential device Rx1 exceeds 90% of full charge of the battery of the device.

In another example embodiment of S110, the at least one preferential device among the multiple wireless energy receiving devices may be determined according to preferential device information. The preferential device information may comprise identifier information of a preferential device, a predetermined energy standard corresponding to the preferential device, and a preference level corresponding to the preferential device. For example, when it is determined that Rx1 and Rx2 are preferential devices having different preference levels, preferential device information may be shown in Table 3:

TABLE 3

| Device Identifier (ID) | Predetermined Energy Standard | Preference Level |
| --- | --- | --- |
| R × 1 | η1 | Rank2 |
| R × 2 | η2 | Rank1 |

Table 3 comprises device identifier information (ID) of preferential devices to be determined, predetermined energy standards corresponding to the preferential devices, and preference levels corresponding to the preferential devices. A person skilled in the art may understand that when multiple wireless energy receiving devices need to be determined as preferential devices, preference degrees of the multiple wireless energy receiving devices may also be different, and this may bring about different preference levels. For example, in Table 3, although Rx1 and Rx2 are both preferential devices, Rx2 is in the first preference level (Rank1), Rx1 is in the second preference level (Rank2), and Rx2 has a higher preference level than Rx1 does.

In this embodiment, in a case where preferential devices have multiple preference levels, the wireless energy sending device Tx performs, in an order from a highest preference level to a lowest preference level, wireless energy transmission on preferential devices having different preference levels.

In the example shown in FIG. 4, Table 4 below uses percentages of charge after the preferential devices Rx1 and Rx2 are charged relative to full charge of the batteries as an example to reflect predetermined energy standards of the preferential devices Rx1 and Rx2, and also shows preference levels of the preferential devices Rx1 and Rx2:

TABLE 4

| Device Identifier (ID) | Predetermined Energy Standard | Preference Level |
| --- | --- | --- |
| R × 1 | 90% | Rank2 |
| R × 2 | 80% | Rank1 |

As shown in Table 4, the wireless energy sending device preferentially charges the preferential device Rx2 having the highest preference level, until the charge of Rx2 exceeds 80% of the full charge of the battery, and then performs wireless energy transmission on the preferential device Rx1 having the relatively low preference level, until the charge of the preferential device Rx1 exceeds 90% of the full charge of the battery.

In an example embodiment, multiple preferential devices may exist in a same preference level. For example, when it is determined that Rx1 and Rx2 are preferential devices in a same preference level, the preferential device information may be shown in Table 5 below:

TABLE 5

| Device Identifier (ID) | Predetermined Energy Standard | preference level |
| --- | --- | --- |
| R × 1 | η1 | Rank1 |
| R × 2 | η2 | Rank1 |

In such a case, in an example embodiment, the wireless energy sending device Tx may perform wireless energy transmission on the multiple preferential devices Rx1 and Rx2 in a same preference level alternately. In such a process, the wireless energy sending device Tx may perform energy transmission on the preferential devices Rx1 and Rx2 in a same preference level in turn within a same or close transmission time. Every time when a wireless energy receiving device that receives energy is switched, the wireless energy sending device Tx performs phase calibration on all emitter nodes to achieve an optimal energy transmission effect.

In another example embodiment, the wireless energy sending device Tx may control multiple emitter nodes of the wireless energy sending device Tx to perform wireless energy transmission separately on the multiple preferential devices Rx1 and Rx2 in a same preference level. In such a process, the wireless energy sending device Tx may control, on the basis of a distribution plan of distributing separately the multiple emitter nodes of the wireless energy sending device Tx to the multiple preferential devices, the multiple emitter nodes to separately perform wireless energy transmission on corresponding preferential devices to which the multiple emitter nodes are distributed. Moreover, in a wireless energy transmission process, as the charge of each preferential device changes, the distribution plan may further be dynamically adjusted, and according to an adjusted distribution plan, wireless energy transmission is performed on the multiple preferential devices.

In an example embodiment, the method in this embodiment may further comprise S120: Acquire remaining energy information of at least one preferential device. As previously introduced in S150, the wireless energy sending device needs to preferentially charge at least one preferential device, until a predetermined charge standard needed by a user is reached, and therefore current remaining energy information of a preferential device is an important basis for performing the foregoing charging.

In an example embodiment of S120, the wireless energy sending device Tx may directly acquire, from one or more preferential devices, remaining energy information of the one or more preferential devices separately, or one or more preferential devices may first send respective remaining energy information to an independent device, and the wireless energy sending device Tx then acquires the respective remaining energy information from the independent device. A person skilled in the art may understand that, the remaining energy information may be a current remaining energy value of a preferential device, and corresponding to a predetermined energy standard, the remaining energy information may be reflected by using, for example, a percentage of current charge of a device relative to full charge of a battery of the device, or a current voltage value of a battery of a device. For example, as shown in FIG. 4, when a percentage of current charge of a device relative to full charge of a battery of the device is used to represent remaining energy information of the preferential devices Rx1 and Rx2, it may be acquired that the remaining energy information of the preferential device Rx1 is 20%, and the remaining energy information of the preferential device Rx2 is 50%.

A person skilled in the art may understand that because the remaining energy information reflects a current remaining energy level of each preferential device, in the process of implementing this method, the wireless energy sending device Tx may acquire the remaining energy information in real time to learn a latest remaining energy level of a preferential device, so as to provide a real-time basis for device selection for wireless energy transmission.

As can be seen, according to the foregoing method in this embodiment, in a process that the wireless energy sending device transmits energy to multiple wireless energy receiving devices in a system, one or more wireless energy receiving devices may be preferentially charged or at least be preferentially charged to a predetermined extent as wanted by a user. In this way, even though energy transmission must be interrupted because of special events in the entire system charging process, the user may still achieve a desired charging result at the end of a preferential device, thereby meeting a use need of the user for a preferential device.

A person skilled in the art may understand that in the foregoing method in the example embodiment of the present application, the sequence numbers of the steps do not mean an execution sequence, and the execution sequence of the steps should be determined by the functions and internal logic of the steps rather than to cause any limitations on the implementation process of an example embodiment of the present application.

In addition, an embodiment of the present application further provides a computer readable medium, which comprises a computer readable instruction that executes the following operation when being executed: executing the steps and operations in the method in the example embodiment shown in FIG. 3 in the foregoing.

Figure 5:
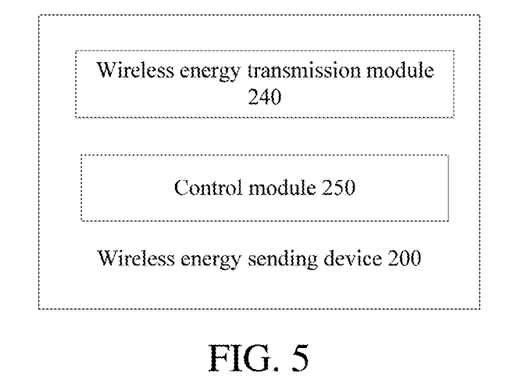
FIG. 5 is an example schematic structural diagram of a wireless energy sending device in an embodiment of the present application.

As shown in FIG. 5, a wireless energy sending device 200 is provided according to another embodiment of the present application. The device 200 may perform wireless energy transmission on multiple wireless energy receiving devices in a wireless energy transmission system, for example, is implemented as the wireless energy sending device Tx in FIG. 4. The device 200 comprises:
 a wireless energy transmission module 240, configured to perform wireless energy transmission on at least one wireless energy receiving device; and
 a control module 250, configured to control, according to remaining energy information of at least one preferential device among multiple wireless energy receiving devices, the wireless energy transmission module to perform wireless energy transmission on at least one of the at least one preferential device, until a predetermined energy standard corresponding to the preferential device on which wireless energy transmission is performed is reached.

Next, the functions of the modules in the wireless energy sending device in this embodiment are described in detail with reference to FIG. 5 to FIG. 7.

FIG. 4 shows an example of a wireless energy transmission system to which the method in this embodiment is applicable. The system comprises one wireless energy sending device Tx (the wireless energy sending device 200) and multiple wireless energy receiving devices Rx. In this embodiment, the wireless energy transmission module 240 of the wireless energy sending device 200 may perform wireless energy transmission on any of the foregoing 3 wireless energy receiving devices Rx1, Rx2, and Rx3. In a case where at least one preferential device among the wireless energy receiving devices Rx1, Rx2, and Rx3 needs to be preferentially charged, the control module 250 controls the wireless energy transmission module 240 to perform wireless energy transmission on the preferential device, until a predetermined standard needed by a user is reached.

Figure 6:
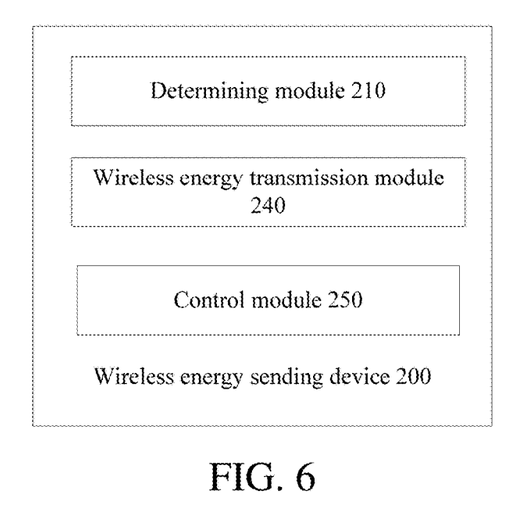
FIG. 6 is another example schematic structural diagram of a wireless energy sending device in an embodiment of the present application.

In an example embodiment, as shown in FIG. 6, this embodiment device may further comprise a determining module 210, configured to determine at least one preferential device among the multiple wireless energy receiving devices.

In an example embodiment, the determining module 210 may determine the at least one preferential device among the multiple wireless energy receiving devices according to preferential device information, where the preferential device information may comprise identifier information of a preferential device and a predetermined energy standard corresponding to the preferential device.

In another example embodiment, the determining module 210 may determine the at least one preferential device among the multiple wireless energy receiving devices according to preferential device information, where the preferential device information may comprise identifier information of a preferential device, a predetermined energy standard corresponding to the preferential device, and a preference level corresponding to the preferential device.

In this embodiment, in a case where preferential devices have multiple preference levels, the control module 250 may control the wireless energy transmission module 240 to perform, in an order from a highest preference level to a lowest preference level, wireless energy transmission on preferential devices having different preference levels.

In an example embodiment, multiple preferential devices may exist in a same preference level. In such a case, in an example embodiment, the control module 250 may control the wireless energy transmission module 240 to alternately perform wireless energy transmission on the multiple preferential devices in a same preference level. In such a process, the wireless energy transmission module 240 may perform energy transmission on the preferential devices in a same preference level in turn within a same or close transmission time. Every time when a wireless energy receiving device that receives energy is switched, the wireless energy transmission module 240 performs phase calibration on all emitter nodes to achieve an optimal energy transmission effect.

In another example embodiment, the control module 250 may control the multiple emitter nodes of the wireless energy transmission module 240 to perform wireless energy transmission separately on the multiple preferential devices in a same preference level. In such a process, the control device 250 may control, on the basis of a distribution plan of distributing separately multiple emitter nodes to the multiple preferential devices, the multiple emitter nodes of the wireless energy transmission module 240 to perform wireless energy transmission separately on corresponding preferential devices to which the multiple emitter nodes are distributed.

In an example embodiment, this embodiment device may further comprise an acquisition module 220, configured to acquire remaining energy information of at least one preferential device. In an example embodiment, the acquisition module 220 may directly acquire, from one or more preferential devices, remaining energy information of the one or more preferential devices separately, or one or more preferential devices may also first send respective remaining energy information to an independent device, and the wireless energy sending device Tx then acquires the respective remaining energy information from the independent device.

As can be seen, according to the foregoing device in this embodiment, in a process that the wireless energy sending device transmits energy to multiple wireless energy receiving devices in a system, one or more wireless energy receiving devices may be preferentially charged or at least be preferentially charged to a predetermined extent as wanted by a user. In this way, even though energy transmission must be interrupted because of special events in the entire system charging process, the user may still achieve a desired charging result at the end of a preferential device, thereby meeting a use need of the user for a preferential device.

Figure 8:
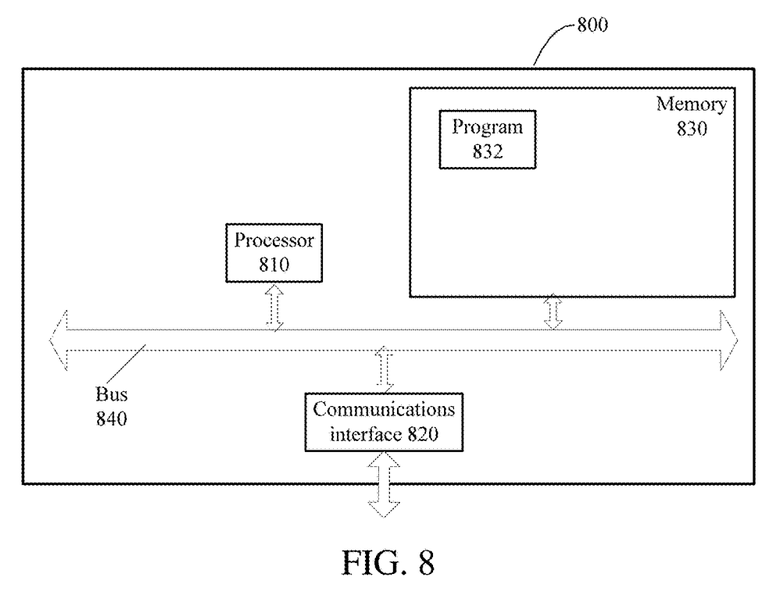
FIG. 8 is an example schematic diagram of a hardware structure of a wireless energy sending device in an embodiment of the present application.

FIG. 8 is a schematic structural diagram of a wireless energy sending device 800 provided in an embodiment of the present application. Specific embodiments of the present application do not cause any limitation on specific implementation of the wireless energy sending device 800. As shown in FIG. 8, the wireless energy sending device 800 may comprise:

a processor 810, a communications interface 820, a memory 830, and a communications bus 840. Where: the processor 810, the communications interface 820, and the memory 830 accomplish communication with each other by using the communications bus 840.

The communications interface 820 is configured to communicate with a network element such as a client.

The processor 810 is configured to execute a program 832, and may specifically implement functions related to the wireless energy sending device in the apparatus embodiments shown in FIG. 1 to FIG. 4 above.

Specifically, the program 832 may comprise program code, and the program code comprises a computer operation instruction.

The processor 810 may be a central processing unit (CPU), or an application specific integrated circuit (ASIC), or may be configured as one or more integrated circuits that implement the embodiment of the present application.

The memory 830 is configured to store the program 832. The memory 830 may comprise a high-speed RAM memory, or may further comprise a non-volatile memory, for example, at least one magnetic disk memory. The program 832 may specifically implement the following operation:

performing, according to remaining energy information of at least one preferential device among multiple wireless energy receiving devices, wireless energy transmission on at least one of the at least one preferential device, until a predetermined energy standard corresponding to the preferential device on which wireless energy transmission is performed is reached.

Figure 7:
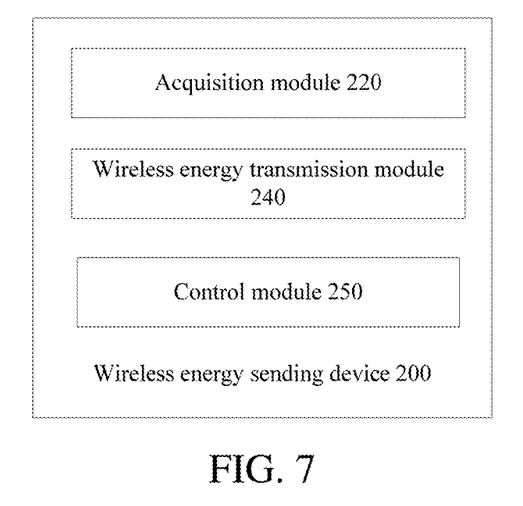
FIG. 7 is another example schematic structural diagram of a wireless energy sending device in an embodiment of the present application.

Reference may be made to correspondingly modules in the embodiments shown in FIG. 5 to FIG. 7 for the specific implementation of each unit in the program 832, which is no longer elaborated here.

A person skilled in the art may clearly understand that for convenience and simplicity of description, for the specific working procedure of the device and module described above, reference may be made to the corresponding description in the apparatus embodiments, which are no longer elaborated herein.

Although the subject here is provided in the general context that is executed in combination with the execution of an operating system and application software, a person skilled in the art may realize that other implementations may be executed in combination with another type of program module. Generally, a program module comprises a routine, a program, a component, a data structure, and another type of structure that executes a specific task or implements a specific abstract data type. A person skilled in the art may understand that the subject herein may be implemented by using another computer system configuration, which comprises a handheld device, a multiprocessor system, a microprocessor-based or programmable consumer electronic product, a mini computer, a mainframe computer, and the like, or may also be used in a distributed computing environment in which a task is executed by a remote processing device connected to a communications network. In the distributed computing environment, the program module may be located in both a local memory storage device and a remote memory storage device.

Persons of ordinary skill in the art may further appreciate that, in combination with the examples described in the embodiments herein, units and method steps can be implemented by electronic hardware or a combination of computer software and electronic hardware. Whether these functions are performed using hardware or software depends on particular applications and design constraints of the technical solutions. A person skilled in the art may use different methods to implement the described functions for each specific application. However, such implementation should not be considered as beyond the scope of the present application.

If implemented in the form of software functional units and sold or used as an independent product, the functions may also be stored in a computer readable storage medium. Based on this, the technical solution of the present application or the part that makes contributions to the prior art or the part of the technical solution can be substantially embodied in the form of a software product. The computer software product may be stored in a storage medium and contain several instructions to cause computer equipment (for example, a personal computer, a server, or network equipment) to perform all or a part of the steps of the method described in the embodiments of the present application. The foregoing computer readable storage medium comprises physical volatile and nonvolatile, removable and removable medium that is implemented by using any manner or technology of storing information such as a computer readable instruction, a data structure, a program module or other data. The computer readable storage medium specifically comprise S, but is not limited to, a USB flash drive, a removable hard disk, a Read-Only Memory (ROM, Read-Only Memory), an erasable programmable ROM (EPROM), an electrically erasable programmable ROM (EEPROM), a flash drive or another solid-state memory technology, a compact disc-ROM (CD-ROM), a digital versatile disc (DVD), a high definition-DVD (HD-DVD), a Blue-Ray or another optical storage device, a magnetic tape, a disk storage or another magnetic storage device, or any other medium that can be used to store needed information and accessible by a computer.

The foregoing example embodiments are only used for describing the present application rather than to limit the present application. A person of ordinary skill in the technical field may further make various changes and modifications without departing from the spirit and scope of the present application; therefore, all equivalent technical solutions also fall within the scope of the present application, and the patent scope of the present application shall be defined by the claims.

What is claimed is:

1. A method, comprising:
    transmitting, by a system comprising a processor according to remaining energy information of at least one preferential device among multiple wireless energy receiving devices, wireless energy to at least one of the at least one preferential device, until a predetermined energy standard corresponding to the at least one of the at least one preferential device to which the wireless energy is transmitted is reached,
    wherein the at least one preferential device has at least one preference level, and
    wherein the transmitting comprises, in response to determining that a preference level of the at least one preference level comprises multiple preferential devices, performing the transmitting of the wireless energy to the multiple preferential devices of the preference level by alternating the transmitting of the wireless energy to respective preferential devices of the multiple preferential devices of the preference level.

2. The method of claim 1, further comprising:
    acquiring the remaining energy information of the at least one preferential device.

3. The method of claim 2, wherein the acquiring the remaining energy information of the at least one preferential device comprises:
    acquiring the remaining energy information from the at least one preferential device separately, or
    acquiring the remaining energy information of the at least one preferential device from an independent device.

4. The method of claim 1, further comprising:
    determining the at least one preferential device among the multiple wireless energy receiving devices.

5. The method of claim 4, wherein the determining the at least one preferential device among the multiple wireless energy receiving devices comprises:
    determining the at least one preferential device among the multiple wireless energy receiving devices according to preferential device information, and wherein the preferential device information comprises identifier information of the preferential device and the predetermined energy standard corresponding to the at least one of the at least one preferential device.

6. The method of claim 4, wherein the determining the at least one preferential device among the multiple wireless energy receiving devices comprises:
    determining the at least one preferential device among the multiple wireless energy receiving devices according to preferential device information, and wherein the preferential device information comprises identifier information of the at least one of the at least one preferential device, the predetermined energy standard corresponding to the at least one of the at least one preferential device, and a preference level corresponding to the at least one of the at least one preferential device.

7. The method of claim 1, wherein the transmitting comprises, in response to determining that the at least one preference level comprises multiple preference levels, performing, in an order from a highest preference level to a lowest preference level in the at least one preference level, the transmitting of the wireless energy to preferential devices of the at least one preferential device having different preference levels.

8. The method of claim 1, wherein the transmitting comprises, in response to determining that another preference level in the at least one preference level comprises other multiple preferential devices, controlling multiple emitter nodes of a wireless energy sending device to transmit the wireless energy to the other multiple preferential devices of the other preference level separately.

9. A device, comprising:
    a processor, coupled to a memory, that executes or facilitates execution of executable modules, comprising:
    a wireless energy transmission module configured to transmit wireless energy to at least one wireless energy receiving device; and
    a control module configured to control, according to remaining energy information of at least one preferential device among multiple wireless energy receiving devices, the wireless energy transmission module to transmit the wireless energy to at least one of the at least one preferential device, until a predetermined energy standard corresponding to the preferential device on which the wireless energy is transmitted is reached,
    wherein the at least one preferential device has at least one preference level, and
    the control module, in response to a determination that a preference level of the at least one preference level comprises multiple preferential devices, controls the wireless energy transmission module to transmit the wireless energy to the multiple preferential devices of the preference level by alternating transmission of the wireless energy to respective preferential devices of the multiple preferential devices of the preference level.

10. The device of claim 9, wherein the executable modules further comprise:
    an acquisition module configured to acquire the remaining energy information of the at least one preferential device.

11. The device of claim 10, wherein the acquisition module is configured to:
    acquire the remaining energy information from the at least one preferential device separately, or
    acquire the remaining energy information of the at least one preferential device from an independent device.

12. The device of claim 9, wherein the executable modules further comprise:
    a determining module configured to determine the at least one preferential device among the multiple wireless energy receiving devices.

13. The device of claim 12, wherein the determining module is configured to:
    determine the at least one preferential device among the multiple wireless energy receiving devices according to preferential device information.

14. The device of claim 9, wherein
    the control module, in response to a determination that the at least one preferential device has multiple preference levels, controls the wireless energy transmission module to perform, in an order from a highest preference level to a lowest preference level in the multiple preference levels, transmission of the wireless energy to preferential devices of the at least one preferential device having different preference levels.

15. The device of claim 9, wherein, and
    the control module, in response to determining that another preference level in the at least one preference level comprises other multiple preferential devices, controls multiple emitter nodes of the wireless energy transmission module to transmit the wireless energy to the other multiple preferential devices of the other preference level separately.

16. A non-transitory computer-readable medium having instructions stored thereon that, in response to execution, cause a device comprising a processor to perform operations, comprising:
- transmitting, according to remaining energy information of at least one preferential device among multiple wireless energy receiving devices, wireless energy to a preferential device of the at least one preferential device, until a predetermined energy standard corresponding to the preferential device to which the wireless energy is transmitted is determined to be reached,
- wherein the at least one preferential device has at least one preference level, and
- wherein the transmitting comprises, in response to determining that a preference level of the at least one preference level comprises multiple preferential devices, transmitting the wireless energy to the multiple preferential devices of the preference level by alternating the transmitting of the wireless energy to respective preferential devices of the multiple preferential devices of the preference level.

17. The non-transitory computer-readable medium of claim 16, wherein the operations further comprise:
- acquiring the remaining energy information of the at least one preferential device.

18. The non-transitory computer-readable medium of claim 16, wherein the transmitting comprises, in response to determining that the at least one preference level comprises multiple preference levels, performing, in an order from a highest preference level to a lowest preference level in the at least one preference level, the transmitting of the wireless energy to preferential devices of the at least one preferential device having different preference levels.

19. The non-transitory computer-readable medium of claim 16, wherein the transmitting comprises, in response to determining that another preference level in the at least one preference level comprises other multiple preferential devices, controlling multiple emitter nodes of a wireless energy sending device to transmit the wireless energy to the other multiple preferential devices of the other preference level separately.

* * * * *